T. W. Porter,
Shaft Coupling,
No 78,827. Patented June 9, 1868.
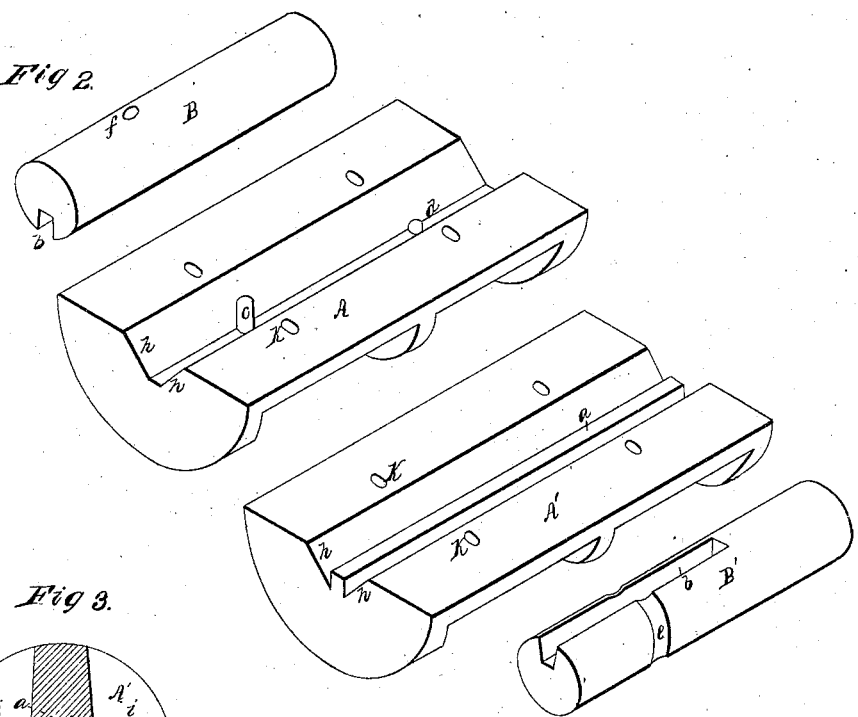
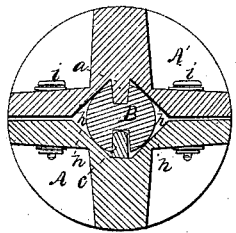
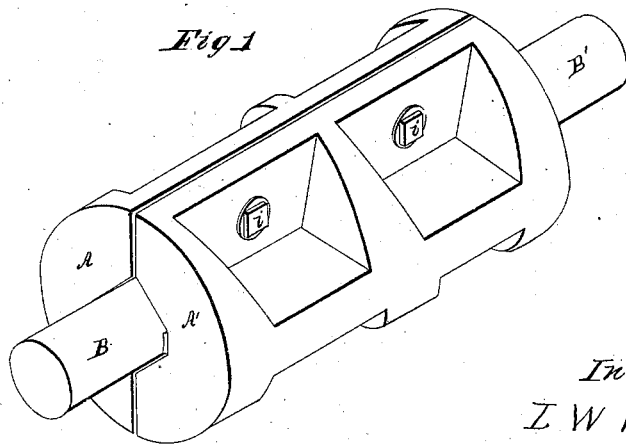
Witnesses.
R. D. Fort
S. M. Gumph
Inventor.
T. W. Porter.

United States Patent Office.

T. W. PORTER, OF BOSTON, MASSACHUSETTS.

*Letters Patent No.* 78,827, *dated June* 9, 1868.

---

IMPROVED SHAFT-COUPLING.

---

The Schedule referred to in these Letters Patent and making part of the same.

---

TO ALL WHOM IT MAY CONCERN:

Be it known that I, T. W. PORTER, of Boston, in the county of Suffolk, and State of Massachusetts, have invented a new and useful Shafting-Coupling; and I do hereby declare that the following is a full, clear, and exact description of the construction and operation of the same, reference being had to the accompanying drawings, and to the letters of reference marked thereon, making a part of this specification, in which—

Figure 1 is a perspective view of the coupling applied to the shafting.

Figure 2 is a perspective view of the same taken apart, and

Figure 3 is a cross-section of fig. 1.

Similar letters of reference indicate corresponding parts in the several figures.

The nature of my invention consists in forming a coupling, in two parts or halves, divided by a longitudinal line, with a fixed key, or its equivalent, formed or fitted to one half, which, by fitting into a key-way or recess in the shaft, and the two parts of the coupling being bolted together upon the shaft, at the joint, connect the parts of the shaft firmly together, producing a simultaneous rotary motion in all its parts or sections.

To enable others skilled in the art to make and use my invention, I will describe its construction and operation.

In the drawings, A and A' represent the two halves of the coupling. B and B' are the two parts of the shafting to be coupled together.

In the face or flat sides of the two halves of the coupling is formed a groove or channel, as is clearly shown in fig. 2. These channels I usually form with their sides, $h\ h$, at an angle of about forty-five degrees with the face of the coupling, and of such size as will insure a bearing upon the shaft before the faces of the coupling are brought together. By thus forming the grooves, the shaft has a bearing upon four opposite sides, thereby holding the shaft perfectly in line. The bearing of the shaft in the grooves is clearly shown in fig. 3.

In the bottom of the groove, in A', is a key, $a$, which is a part of the coupling itself, and fits into the key-way $b$, in the parts of the shaft B and B'.

In the bottom of the groove, in A, are inserted two pins, $c$ and $d$. The longer one, $c$, fits into hole $f$ in shaft B, while the shorter one fits into the groove $e$, in shaft B'.

In heavy lines of shafting the key $a$ should be formed in one half of the coupling, as shown, and two pins or projections, similar to $d$, should be formed or inserted in the other half, with a groove, $e$, formed in each part of the shaft, so that the key fitting into the key-way $b$ insures the uniform rotary motion of all parts of the shaft, while the pins or knobs $d$, fitting into the grooves $e$, prevent the thrust or working asunder of the parts of the shaft. But in light shafting two pins, similar to $c$, inserted in one half of the coupling, and fitting into corresponding holes in the shafting, serve the double purpose of preventing the parts of the shaft from end-play, and also receive and impart the torsional strain.

The two halves of the coupling are bolted together upon the shaft by the screw-bolts $i\ i$, which have seats in recesses in the coupling, as shown in figs. 1 and 3.

The following are among the advantages of this coupling: It is lighter than any other, and of less expense, and being self-centring, requires no accurate fitting, except the key and key-way. In finishing, all parts are outside work, and from its form it can be cast more nearly ready for use than any other, while it can be removed from the shafting without moving the shafting asunder, and it is free from the constant difficulties arising from being too loose or too tight, the pressure upon the shaft being regulated by the screw-bolts, and only for the purpose of holding the shaft in line, while the torsional strain and thrust are received by the direct action of the key $a$ and knobs $d$, or the pins $c$, as either are employed.

Having thus described my invention, what I claim as new, and desire to secure by Letters Patent, is—

1. A shafting-coupling, divided longitudinally in halves, as shown at A and A', and secured together by bolts passing outside the shaft, as shown at $i\ i'$; and with the spline or key $a$, or its equivalent, formed upon or inserted in the coupling, substantially as described and shown.

2. The plane bearings $h$, formed in a longitudinally-divided coupling, substantially as and for the purposes specified.

T. W. PORTER.

Witnesses:
J. H. DODGE,
ISABEL DODGE.